A. H. JONES AND M. G. ANTON.
ROLLER BEARING.
APPLICATION FILED MAY 7, 1921.
1,414,473.
Patented May 2, 1922.
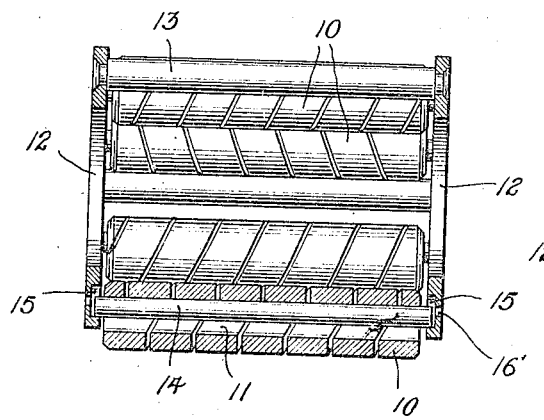
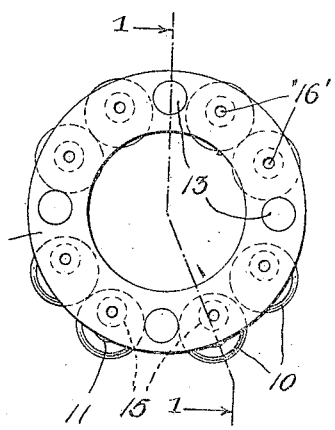
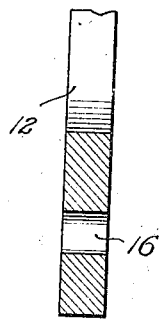
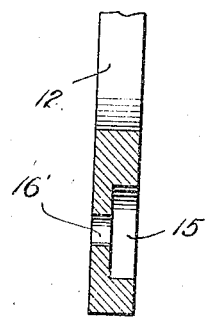
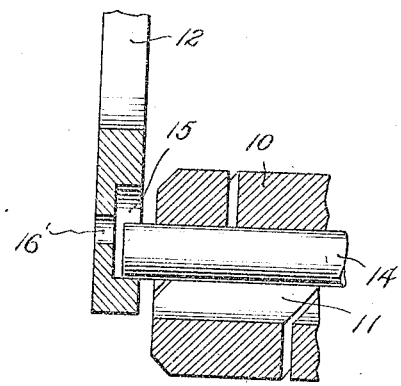
INVENTORS
A. H. Jones and M. G. Anton
BY Geo. H. Beeler
ATTORNEY

UNITED STATES PATENT OFFICE.

ALLAN H. JONES, OF BELLEVILLE, AND MARK G. ANTON, OF NEWARK, NEW JERSEY, ASSIGNORS TO CIRCLE STAMPING AND MFG. CO., OF BELLEVILLE, NEW JERSEY, A CORPORATION OF NEW JERSEY.

ROLLER BEARING.

1,414,473.

Specification of Letters Patent.     Patented May 2, 1922.

Application filed May 7, 1921. Serial No. 467,663.

*To all whom it may concern:*

Be it known that we, ALLAN H. JONES and MARK G. ANTON, both citizens of the United States, residing, respectively, at Belleville, in the county of Essex and State of New Jersey, and Newark, in the county of Essex and State of New Jersey, have invented certain new and useful Improvements in Roller Bearings, of which the following is a specification.

This invention relates to the manufacture of anti-friction bearings, and has particular reference to roller bearings of the cylinder type and made up in a unitary series assembly.

Among the objects of this invention is to provide for a series of bearing rollers, a retaining cage so constructed as to hold the rollers in proper relation to one another as well as to the cage irrespective of the precise length of the rollers.

Another object of the invention is to provide a cage for retaining a series of rollers in a permanent assembly, insuring that the greatest freedom of movement of the rollers laterally with respect to the axis of the cage may be obtained, and yet without any possibility of loss of the rollers or their separation from the cage when being handled apart from the machine with which the bearing is intended to be used.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical longitudinal section of the invention on the line 1—1 of Fig. 2.

Fig. 2 is an end elevation.

Figs. 3 and 4 are detail views showing successive steps in the formation of the cage rings.

Fig. 5 is a detail sectional view indicating on a large scale a preferred relationship as to spacing, between the rollers and the different parts of the cage.

Referring now more specifically to the drawings 10 indicates a circular series of bearing rollers, which while being shown as cylinders may be otherwise shaped if desired. Each of these rollers has a hollow center 11, and while it is shown as of the spiral or so-called flexible type, may obviously be otherwise constructed if desired. In the manufacture of this type of bearing rollers as ordinarily practiced it is a practically impossible thing to form them of uniform length, and therefore it is difficult to assemble a series of said rollers in a cage so as to provide ample looseness of the rollers for freedom of movement, enabling them to readily accommodate themselves to their work. It follows, therefore, that a great many rollers perfectly good and usable under our system, cannot be used satisfactorily with the old or known types of cages.

Our improved cage comprises two end rings 12, stamped usually from sheet metal, the radial width of each ring being less than the diameter of a roller ordinarily so as to insure proper action of the bearing between a shaft and its hub or their equivalent. 13 indicates a set of alining bars of any well known construction and serving to hold the rings 12 in suitable rigid spaced parallel relation to each other. The rollers 10 are arranged loosely in the circumferential spaces between adjacent bars 13.

Each roller is supported loosely upon a retaining bar 14, and so there is provided a large amount of clearance between the bar 14 and the inner wall or surface of the roller.

To effect the greatest possible amount of looseness relatively between the rollers and the cage and yet insure that there can be no separation of the rollers from the cage, the retaining bars 14 are connected loosely with the cage rings 12, and yet this connection is accomplished through a means making it an impossibility for any separation to occur between the bars 14 and the cage rings. To accomplish this object we form the bars 14 as smooth straight flat ended cylinders, the ends of which project loosely into pits 15 formed on the inner faces of the rings. This looseness between the retaining bars and the walls of the pits applies both endwise and laterally of the bars. That is to say, the bars 14 are materially shorter than the space between the bottoms of the pair of opposing pits, and they are very much smaller in diameter than the diameter of the pits. The bars 14, however, are long enough to insure that even though they may move endwise so as to abut against the bottom of one of the pits the opposite ends cannot pass the peripheral wall of the pits at the other end. By way of illustration of suitable dimensions, but without intending to be limited in any manner to such dimensions, we would indicate that the diameter of each pit 15 may be .250 and its depth .075. The diameter of the bars 14 should be .150 and the length so that the opposite ends thereof will project into the pits 15 to the extent of .050. The diameter of the cavity 11 of the rollers is about the same as that of the pits. There is therefore provided a maximum clearance for lateral movement of the bar 14 of .100, and with a similar clearance between the bar and the roller, there is a maximum possible lateral movement of .200 for each roller with respect to the cage.

As indicated in Fig. 3 the pits 15 may be formed by first punching holes 16 directly through the rings, and then by applying other punching tools to the rings concentrically of the holes 16 the metal is mashed down so as to reduce the holes as indicated at 16' in the finished rings. Without first forming holes 16 it is not easy to punch or form the pits 15, but after the holes 16 are formed the pits may be readily and perfectly formed. Furthermore, the holes 16' in the finished cage possess the added advantage of assisting in the circulation of lubricant in and through the bearings, if a relatively light oil is used.

We claim:

1. The herein described roller bearing comprising a cage and a series of rollers mounted loosely therein, said cage including a pair of end rings having pairs of pits formed in the opposing inner surfaces thereof, one pair for each roller, and roller-retaining means projecting loosely into and terminating in said pits.

2. A device as set forth in claim 1 in which the roller-retaining means projecting into the pits is sufficiently less in diameter than the pits to provide a large amount of clearance for free lateral movement thereof in any direction with respect to the rings and the axis of the retaining means.

3. A device as set forth in claim 1 in which the roller-retaining means is materially shorter in effective length than the distance between the bottoms of the corresponding pair of pits, thereby providing for loose endwise movement of the retaining means.

4. A device as set forth in claim 1 in which the roller-retaining means consists of a bar cylindrical in form from end to end and separate from the roller retained thereby.

5. A device as set forth in claim 1 in which the roller-retaining means consists of a cylindrical bar having flat ends and having a diameter materially less than the interior diameter of the roller retained thereby.

6. The herein described roller bearing comprising a cage and a circular series of hollow rollers retained therein, said cage comprising a pair of spaced end rings, the rings having formed therethrough circular series of holes and pits formed on the inner sides of the rings concentric with said holes, means to hold the rings in rigid spaced relation to each other, and a series of members projecting loosely through the respective rollers and into said pits, the roller-retaining members being of greater diameter than said holes.

In testimony whereof we affix our signatures.

ALLAN H. JONES.
MARK G. ANTON.